United States Patent
Radawiec et al.

(10) Patent No.: US 12,503,233 B2
(45) Date of Patent: Dec. 23, 2025

(54) HUMAN WASTE COLLECTION SYSTEM, FOR ZERO-GRAVITY CONDITIONS, THAT AUTOMATICALLY CLOSES A USED WASTE BAG SEGMENT AND PROVIDES AN UNUSED WASTE BAG SEGMENT FROM OPERATION OF A SEAT AND FLUSH ACTUATOR

(71) Applicant: Hamilton Sundstrand Space Systems International, Inc., Windsor Locks, CT (US)

(72) Inventors: Rochelle Radawiec, Vernon, CT (US); Kelly Luker, Glastonbury, CT (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 181 days.

(21) Appl. No.: 18/366,459

(22) Filed: Aug. 7, 2023

(65) Prior Publication Data
US 2025/0051010 A1 Feb. 13, 2025

(51) Int. Cl.
*B64D 11/02* (2006.01)

(52) U.S. Cl.
CPC .................. *B64D 11/02* (2013.01)

(58) Field of Classification Search
CPC ........ B64G 1/60; B64D 11/02; A47K 11/026; A47K 11/12
See application file for complete search history.

(56) References Cited

U.S. PATENT DOCUMENTS

| 2,671,906 | A | 3/1954 | Potts |
| 3,422,985 | A | 1/1969 | Rinehart |
| 3,693,193 | A | 9/1972 | May |
| 5,193,231 | A | 3/1993 | Stender |
| 7,434,377 | B2 * | 10/2008 | Stravitz ................... B65F 1/062 53/526 |
| 11,383,925 | B2 | 7/2022 | Morand |
| 11,414,266 | B2 | 8/2022 | Dunn et al. |

(Continued)

FOREIGN PATENT DOCUMENTS

| BR | 102016018652 A2 * | 2/2018 |
| CH | 702898 A1 | 9/2011 |
| EP | 2547245 B1 | 4/2017 |

(Continued)

OTHER PUBLICATIONS

Translation BR102016018652 A2 (Year: 2025).*

(Continued)

*Primary Examiner* — Janie M Loeppke
(74) *Attorney, Agent, or Firm* — CANTOR COLBURN LLP (57) ABSTRACT

A human waste collection system, for zero-gravity conditions, the collection system having: a basin having a lower end that defines a lower plane and configured for being positioned against a floor and an upper end that is spaced apart from the lower end and displaced further from the plane than the lower end; a seat positioned at the upper end of the basin, the seat having a lid pivotally connected to the seat; a bag cassette disposed under the seat; and a compression ring that is movable within the basin to automatically pull an unused bag segment from the bag cassette, and push down used bags.

12 Claims, 7 Drawing Sheets

(56) References Cited

U.S. PATENT DOCUMENTS 11,684,223 B1 * 6/2023 Mochkin ................ A47K 11/02
4/484

FOREIGN PATENT DOCUMENTS

| | | |
|---|---|---|
| GB | 2409866 | 7/2015 |
| JP | H01153398 A | 6/1989 |
| JP | H01153398 A1 * | 6/1989 |
| KR | 101650682 B1 * | 8/2016 |
| WO | 2020209136 A1 | 10/2020 |

OTHER PUBLICATIONS

Translation JPH01-153398 A (Year: 2025).*
Translation of KR 101650682 B1 (Year: 2025).*
Search Report issued in European Patent Application No. 24192952. 0; Date of Mailing Dec. 16, 2024 (6 pages).

* cited by examiner

HUMAN WASTE COLLECTION SYSTEM, FOR ZERO-GRAVITY CONDITIONS, THAT AUTOMATICALLY CLOSES A USED WASTE BAG SEGMENT AND PROVIDES AN UNUSED WASTE BAG SEGMENT FROM OPERATION OF A SEAT AND FLUSH ACTUATOR

BACKGROUND

The embodiments herein relate to a human waste collection system and more specifically to a human waste collection system, for zero-gravity conditions, that automatically closes a used waste bag segment and provides unused waste bag segment from operation of a seat and flush interface actuator.

Known human waste collection systems in spacecraft require the manual handling and changing of waste bags. These systems, and the training required for utilizing these systems, can present challenges for the commercial space touring industry, which seeks economical and easy to apply solutions.

BRIEF SUMMARY

Disclosed is a human waste collection system, for zero-gravity conditions, the collection system including: a basin having a lower end that defines a lower plane and configured for being positioned against a floor and an upper end that is spaced apart from the lower end and displaced further from the plane than the lower end; a seat positioned at the upper end of the basin, the seat having a lid pivotally connected to the seat; a bag cassette disposed under the seat; and a compression ring that is movable within the basin to automatically pull an unused bag segment from the bag cassette, and push down used bags.

In addition to one or more of the above disclosed aspects of the system or as an alternate, the basin includes an upper portion that includes the upper end, a lower portion that includes the lower end, and a neck between the upper and lower portions of the basin; and the compression ring is movable within the upper portion, between the upper end and the neck to urge the unused bag segment from the bag cassette.

In addition to one or more of the above disclosed aspects of the system or as an alternate, the upper and lower portions of the basin are frustoconical and narrow toward the neck; and the compression ring compresses around the unused bag segment as the compression ring moves from the upper end to the neck, to thereby move the used bag downwardly.

In addition to one or more of the above disclosed aspects of the system or as an alternate, when a used bag segment is within the upper portion of the basin, while the compression ring moves toward the neck, the compression ring urges the used bag segment into the lower portion of the basin.

In addition to one or more of the above disclosed aspects of the system or as an alternate, the system further includes a flexible separator membrane at the neck of the basin, the separator membrane defining a center aperture through which the used bag segment moves when urged into the lower portion, wherein the separator membrane forms a flexible seal around bag material extending through the neck, to thereby capture the used bag segment within the lower portion of the basin.

In addition to one or more of the above disclosed aspects of the system or as an alternate, the compression ring automatically moves from the upper end to the neck when the lid opens, and from the neck to the upper end when the lid closes against the seat.

In addition to one or more of the above disclosed aspects of the system or as an alternate, the compression ring includes first and second ring halves that are separate from each other; and the first and second ring halves move towards each other as the compression ring moves from the upper end of the basin to the neck, to compress around the used bag segment.

In addition to one or more of the above disclosed aspects of the system or as an alternate, the upper portion of the basin includes first and second tracks that are spaced apart from each other and extend between the upper end of the basin and the neck; the collection system further includes: a first track connector connected to the first ring half and first track; a second track connector connected to the second ring half and the second track, wherein the first and second track connectors are coupled to move together within the basin; wherein, opening the lid moves the first and second connectors downwardly to move the compression ring downwardly; and closing the lid moves the first and second connectors upwardly to move the compression ring upwardly.

In addition to one or more of the above disclosed aspects of the system or as an alternate, the system further includes a first actuator that couples the lid and the first slider.

In addition to one or more of the above disclosed aspects of the system or as an alternate, the system further includes an actuator operationally coupled to the basin, wherein when the lid is opened and the interface actuator is engaged, the bag cassette spins to form a twist-closure in a used bag segment disposed in the basin.

In addition to one or more of the above disclosed aspects of the system or as an alternate, the collection system includes a second actuator coupled between the interface actuator and the bag cassette, the second actuator spins the bag cassette while the interface actuator is engaged.

In addition to one or more of the above disclosed aspects of the system or as an alternate, the bag cassette includes an external frame formed with gear teeth; and the second actuator engages with the gear teeth in the external frame of the bag cassette to spin the bag cassette while the interface actuator is engaged.

In addition to one or more of the above disclosed aspects of the system or as an alternate, the system further includes an air mover that directs air into the upper end, wherein the air mover activates when the lid opens to guide waste into the unused bag segment, and the air mover deactivates when the lid closes against the seat.

Further disclosed is a spacecraft, including a lavatory; and a collection system having one or more of the above disclosed aspects, disposed in the lavatory.

BRIEF DESCRIPTION OF THE DRAWINGS

The present disclosure is illustrated by way of example and not limited in the accompanying figures in which like reference numerals indicate similar elements.

DETAILED DESCRIPTION

Aspects of the disclosed embodiments will now be addressed with reference to the figures. Aspects in any one figure is equally applicable to any other figure unless otherwise indicated. Aspects illustrated in the figures are for purposes of supporting the disclosure and are not in any way intended on limiting the scope of the disclosed embodiments. Any sequence of numbering in the figures is for reference purposes only.

Figure 1A:
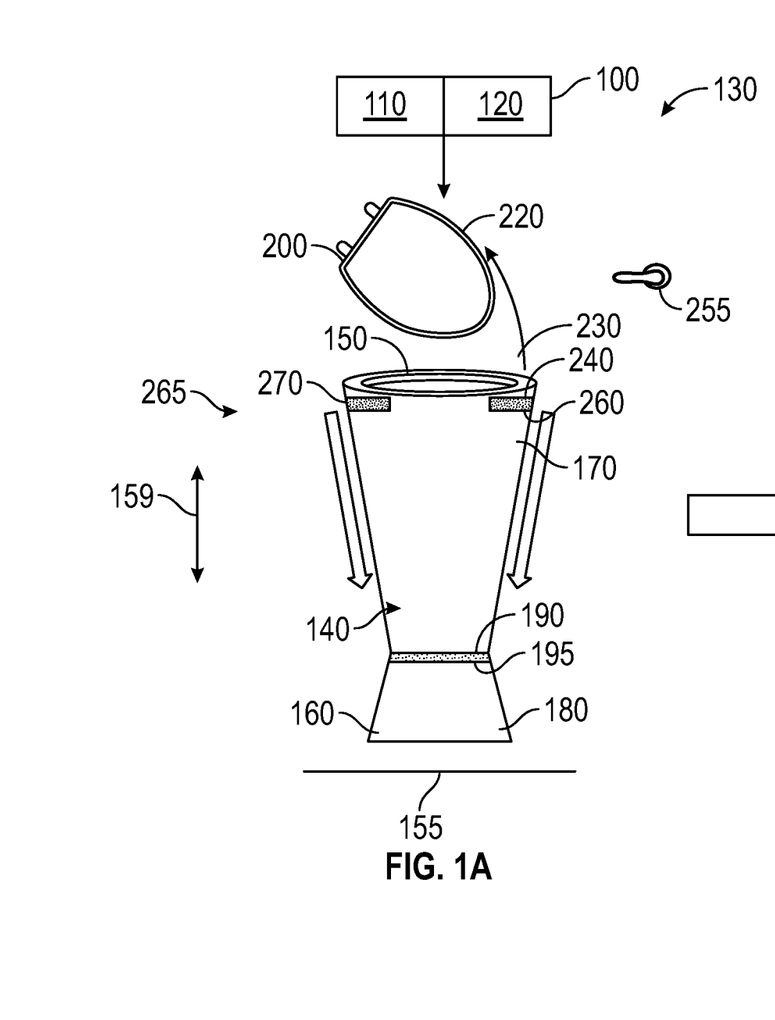
FIG. 1A shows a human waste collection system, for zero gravity conditions, according to an embodiment, where a lid of a seat is being opened to move a compression ring downward in an upper portion of a basin, to provide an unused bag segment from a bag cassette.
Figure 1B:
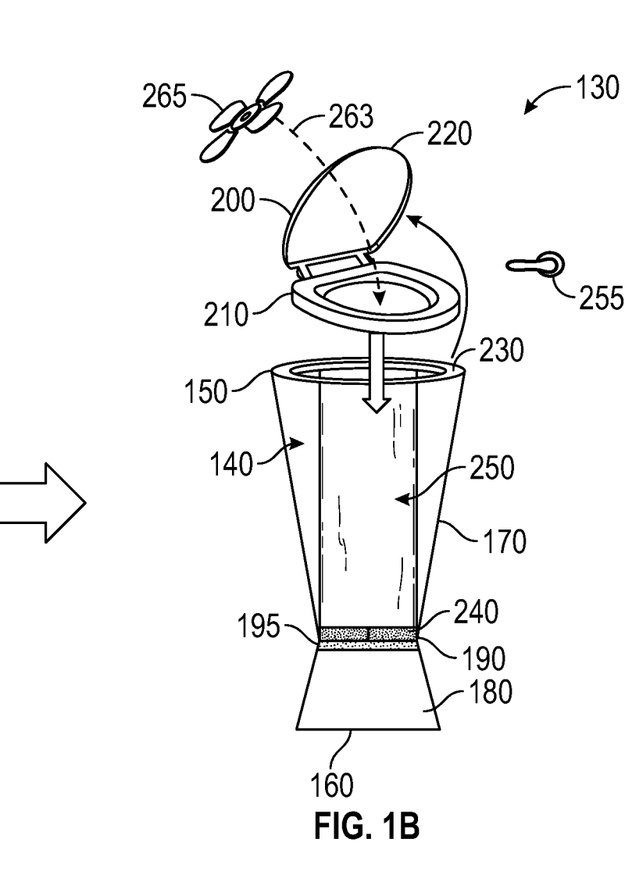
FIG. 1B shows the unused bag segment in the upper portion of the basin, and a fan is activated.

Turning to FIGS. 1A and 1B, a spacecraft 100 may include a cabin 110 and a lavatory 120. Within the lavatory 120, the spacecraft 100 includes a human waste collection system (a collection system) 130, otherwise known as a toilet.

The collection system 130 is configured for use in zero-gravity conditions and includes a basin 140 having a lower end 160 that defines a lower plane 155 (e.g., ground) and configured for being positioned against a floor and an upper end 150 that is spaced apart from the lower end 160 and displaced further from the plane 155 than the lower end 160 (the axis 159 running from the upper end 150 to the lower end 160 defines an up-down direction for the system 130). More specifically, the basin 140 includes an upper portion 170 that includes the upper end 150, a lower portion 180 that includes the lower end 160, and a neck 190 between the upper and lower portions 170, 180. The upper and lower portions 170, 180 of the basin 140 are frustoconical and narrow toward the neck 190. The upper and lower portions 170, 180 are separated by a separator membrane 195, discussed in greater detail below.

A seat 200 is positioned at the upper end 150 of the basin 140. The seat 200 has a base 210 and a lid 220 pivotally connected to the seat 200 and more specifically to the base 210. A bag cassette 230 is located under the seat 200 and more specifically under the base 210. The bag cassette 230 has a rolled up continuous waste collection bag that is sealed at the end first entering the basin.

A compression ring 240 is movable within the basin 140 to automatically draw an unused bag segment 250 from the bag cassette 230. More specifically, the compression ring 240 is movable within the upper portion 170, between the upper end 150 and the neck 190 to draw the unused bag segment 250 from the bag cassette 230. Due to the frustoconical shape of the upper portion 170 of the basin 140, the compression ring 240 compresses around the unused bag segment 250 as the compression ring 240 moves from the upper end 150 to the neck 190. In one embodiment, the compression ring 240 automatically moves from the upper end 150 to the neck 190 when the lid 220 opens, to draw the unused bag segment 250 from the bag cassette 230 into the upper portion 170 of the basin 140. An interface actuator 255, which may be a trip lever arm, is engaged, e.g., provided, to close the unused bag segment 250 after it is used, discussed in greater detail below.

An air stream 263 flows into the upper end 150, which is provided via an air mover 265, which may be a fan, drawing air from the cabin 110 down through the upper portion toward the neck and out the side of the upper portion. The air mover 265 activates when the lid 220 opens to guide waste into the unused bag segment 250. The air mover 265 deactivates when the lid 220 closes against the seat 200.

The compression ring 240 includes first and second ring halves 260, 270 that are separate from each other. The first and second ring halves 260, 270 move towards each other as the compression ring 240 moves from the upper end 150 of the basin 140 to the neck 190, to compress around a portion of unused bag segment 250.

Figure 2:
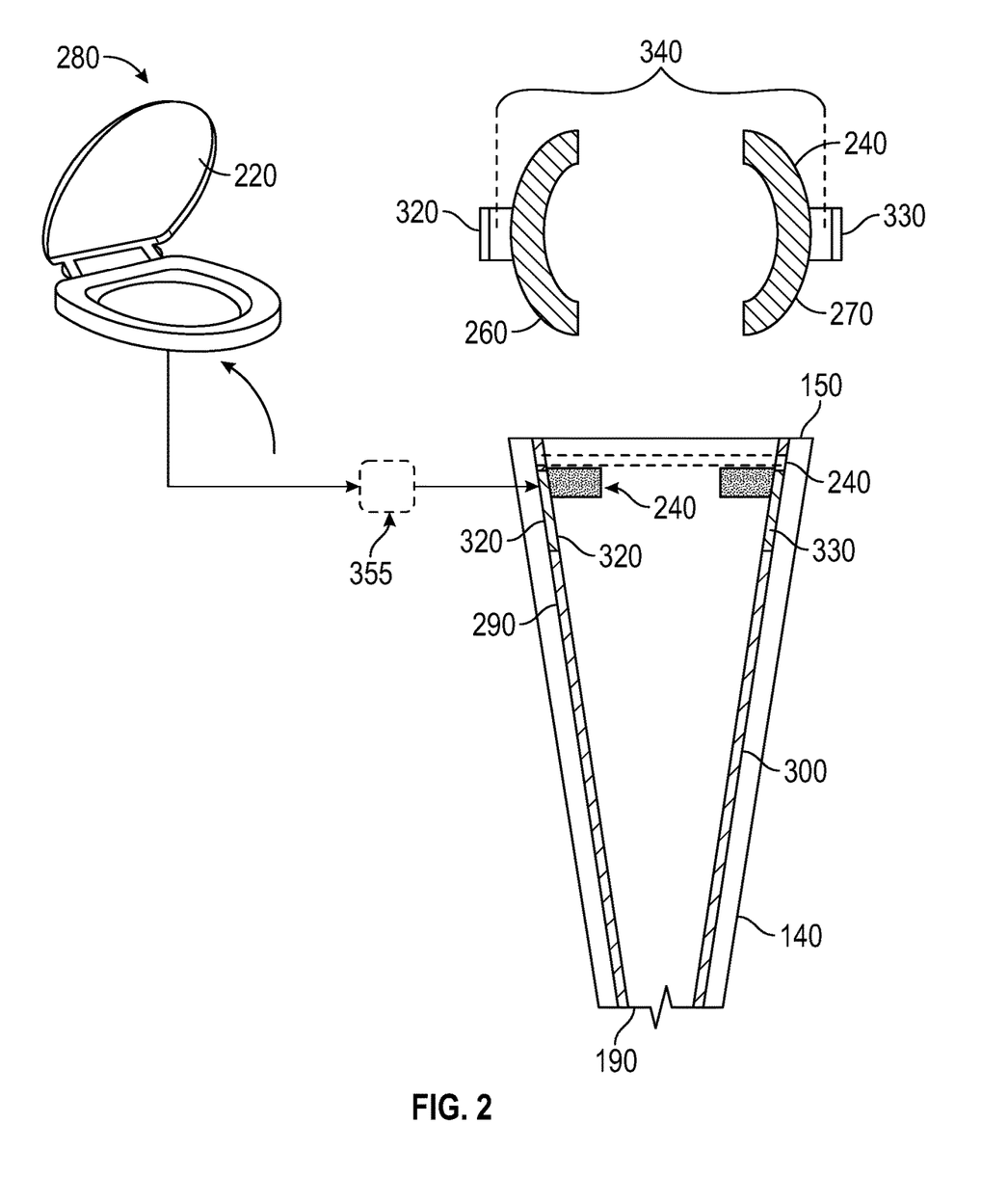
FIG. 2 shows additional details of the compression ring and implements for moving the compression ring downward upon opening the lid and moving the compression ring upward upon closing the lid.

As shown in FIG. 2 a bag feed system 280 is utilized to move the compression ring 240 and draw an unused bag length 250 (FIG. 1B) from the bag cassette 230. The bag feed system 280 includes first and second tracks 290, 310 that are spaced apart from each other and extend between the upper end 150 of the basin 140 and the neck 190. A first track connector 320 for connecting the first half 260 of the compression ring 240 to the first track 290. The first track connector 320 may be a geared member, similar to a gear rack. The first track connector 320 is disposed in the first track 290. A second track connector 330, which may or may not be geared, is connected to the second ring half 270 and is disposed in the second track 300. A runner 340 couples the first and second sliders 320, 330. A first actuator with motor (collectively referred to as an actuator or a first actuator) 355 couples the lid 220 and the first track connector 350. For example, the first actuator 355 may be geared that couples with the gears in the first track connector 290 to move the first track connector 290. With this configuration, opening the lid 220 moves the first and second track connector 320, 330 downwardly, along with the compression ring 240. Closing the lid 220 moves the first and second track connector 320, 330 upwardly, along with the compression ring 240. A reduction gearing configuration may be utilized so that a small rotation of the lid 220 causes the compression ring 240 to move from the upper end 150 to the basin 140 to the neck 190. It is to be appreciated that the implements in the disclosed bag feed system 280 represent one of many ways that can be utilized to move the compression ring 240 within the basin 140.

Figure 3A:
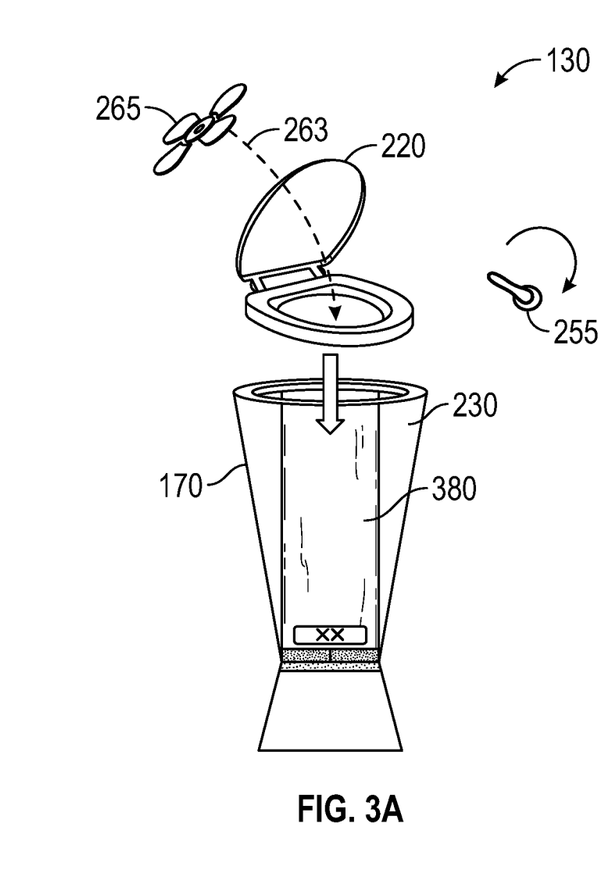
FIG. 3A shows the collection system of FIG. 1, where an interface actuator is engaged to spin a bag cassette to provide a twist closure in a used bag segment within the basin.
Figure 3B:
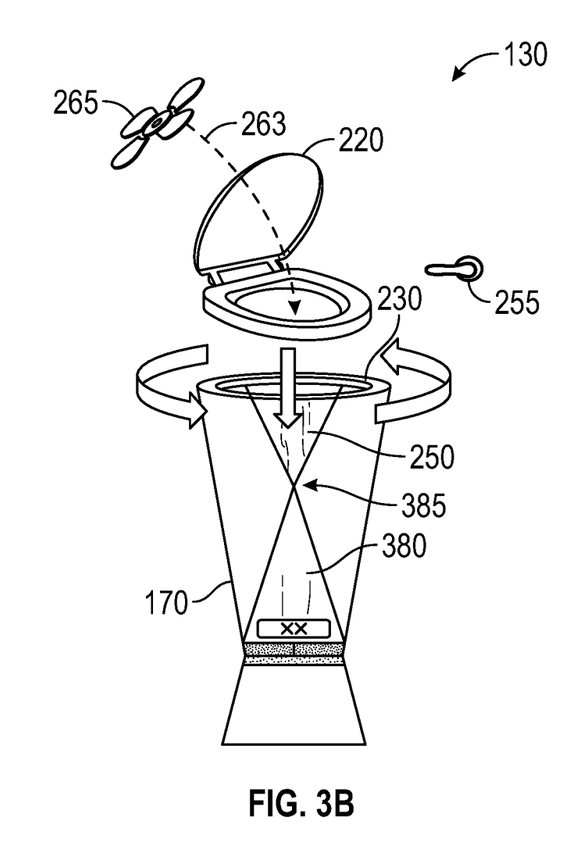
FIG. 3B shows the twist closure formed in the used bag segment.

Turning to FIGS. 3A and 3B, the interface actuator 255 is operationally coupled to the basin 140. When the lid 220 is opened and the interface actuator 255 is pivoted, the bag cassette 230 spins to form a twist closure 385 in a used bag segment 380 disposed in the upper portion 170 of the basin 140.

Figure 4:
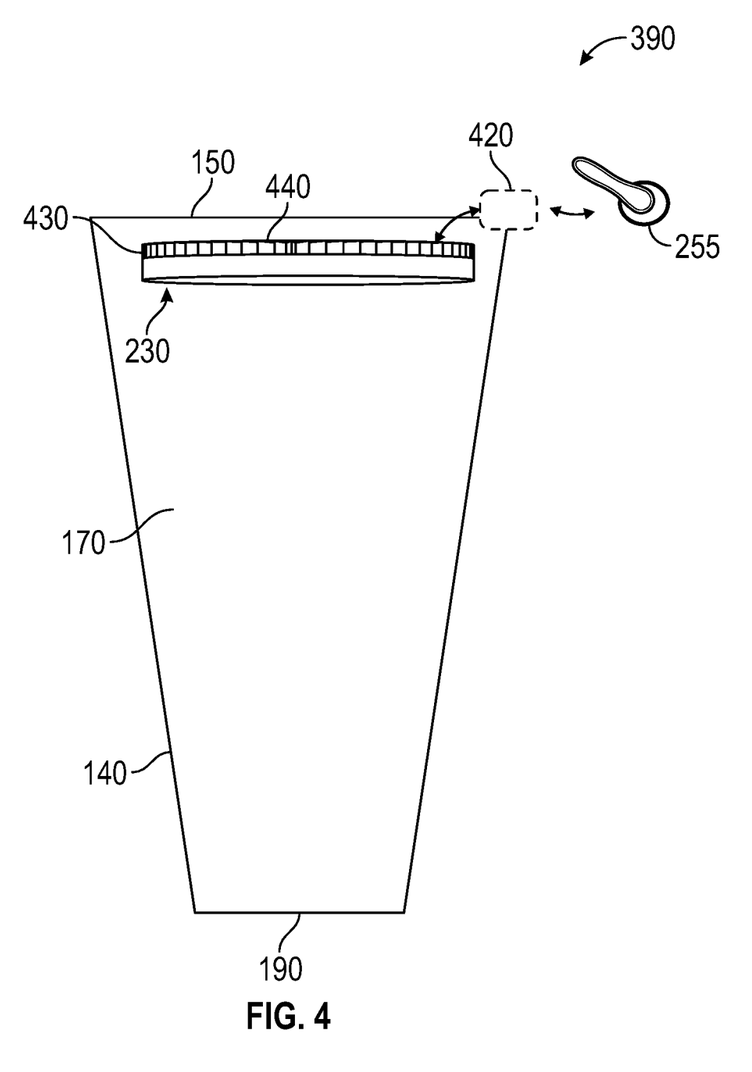
FIG. 4 shows implements for spinning the bag cassette upon engaging the interface actuator to provide the twist closure.

Turning to FIG. 4, the collection system 130 includes a bag segment separation system 390. The bag closing system 390 includes a second actuator and motor (collectively referred to as an actuator or a second actuator) 420 that is connected between the interface actuator 255 and the bag cassette 230 to spin the bag cassette 230 while the interface actuator 255 is engaged. The bag cassette 230 may include an external frame 430 formed with gear teeth 440 to engage with gearing in the second actuator 420. A reduction gearing configuration may be utilized so that small rotation of the interface actuator 255 rotates the cassette 230 the desired amount to provide the twist closure 385. It is to be appreciated that the implements in the disclosed bag closing system 390 represent one of many ways that can be utilized to close the used bag segment 390 within the basin 140.

Figure 5A:
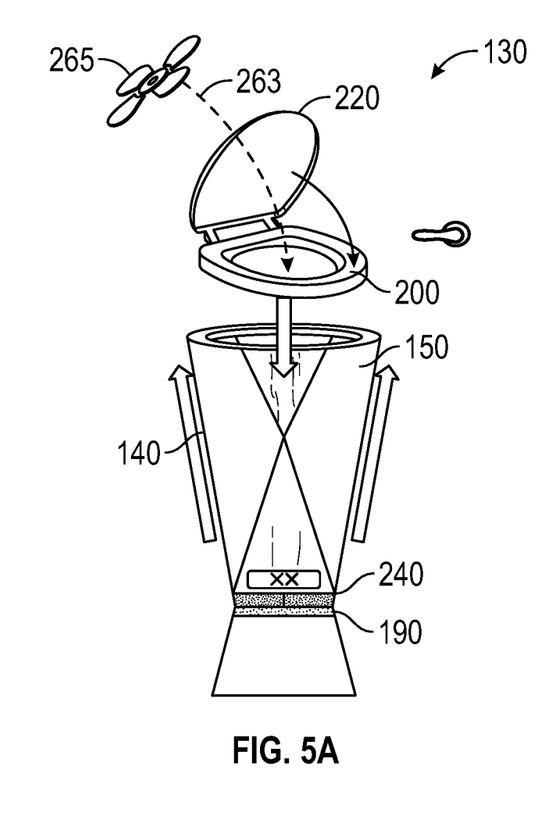
FIG. 5A shows the collection system of FIG. 1, where the lid of the seat is being closed to move the compression ring toward the top of the basin.
Figure 5B:
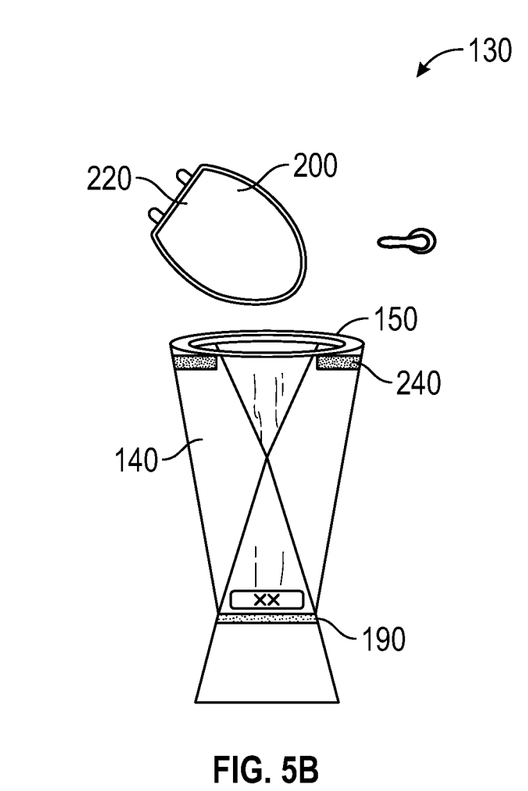
FIG. 5B shows the compression ring at the top of the basin, and the fan is deactivated.

Turning to FIGS. 5A and 5B, the compression ring 240 automatically moves from the neck 190 to the upper end 150 of the basin 240 when the lid 220 closes against the seat 200. Lid closure turns off the air stream.

Figure 6A:
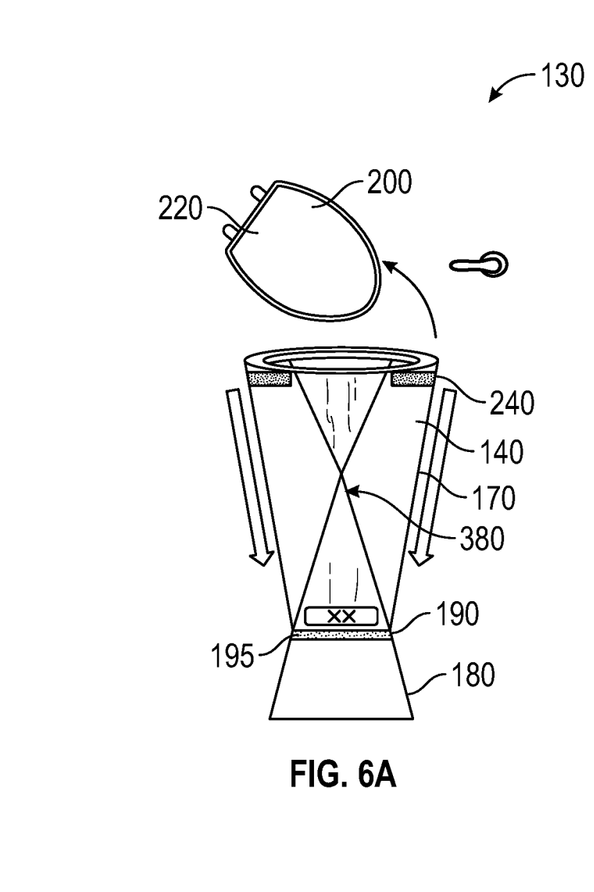
FIG. 6A shows the collection system of FIG. 1, where the lid of the seat is being opened to move the compression ring downward to provide an unused bag segment in the upper portion of the basin and move the used bag segment into a lower portion of the basin.
Figure 6B:
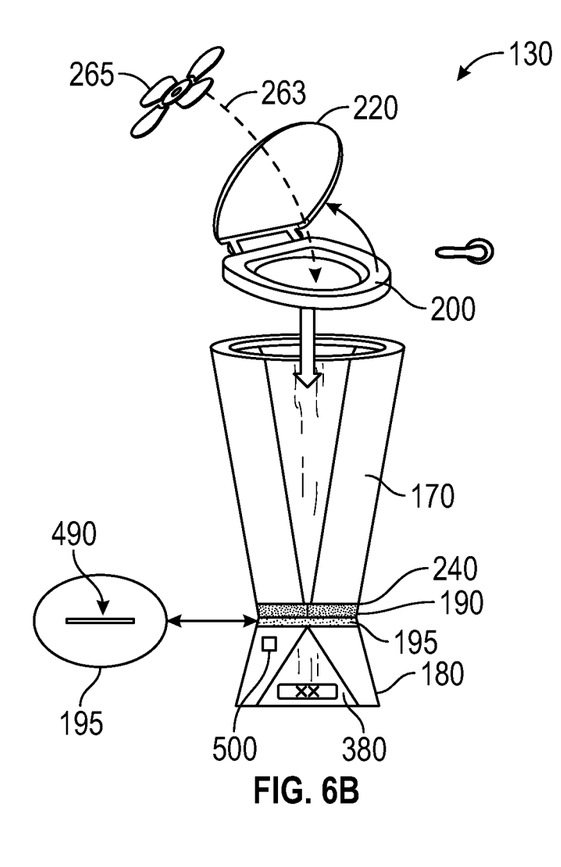
FIG. 6B shows the unused bag segment in the upper portion of the basin, the used bag segment in the lower portion of the basin, and the fan is activated.

Turning to FIGS. 6A and 6B, when the waste collection system 130 is again used, later, the lid 220 of the seat 200 is again opened. With the used bag segment 380 is within the upper portion 170 of the basin 140, while the compression ring 240 moves toward the neck 190, the compression ring 240 pushes the used bag segment 380 into the lower portion 180 of the basin 140.

It is to be appreciated that the compression ring may be considered as pulling the new bag segment down, or pushing the used bag segment down, or both. Alternatively, the air stream may advance the new bag segment downward.

The flexible separator membrane 195 is located within the neck 190 of the basin 140. The separator membrane 195 defines a center aperture 490, which may be a linear or star-shaped slit as non-limiting examples, through which the used bag segment 380 moves when urged into the lower portion 180. The separator membrane 195 forms a flexible seal around bag material extending through the neck 190. This configuration captures the used bag segment 380 within the lower portion 180 of the basin 140. A dehydration mechanism 500, such as a dehumidifier, may be provided in the lower portion 180 to dehydrate stored waste.

Figure 7:
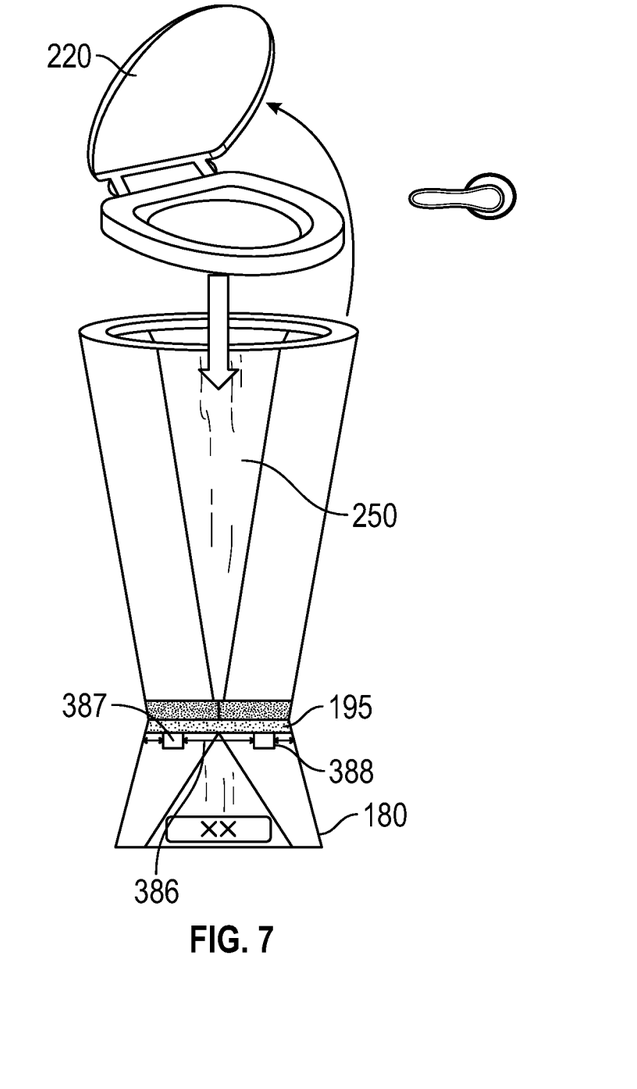
FIG. 7 shows the unused bag segment in the upper portion of the basin, the used bag segment in the lower portion of the basin. The lower portion of the basin may include a mechanism to tie and/or cut the used bag from the unused bag.

As shown in FIG. 7, in one embodiment, the twist-closure 385 may further be secured with a retractable tying machine 387, shown schematically in the lower portion 180, below the membrane 195. The tying machine 287, which is also known as a tape binder, wraps a loop of tape 386 from a roll of tape around the twist-closure 385, staples the tape ends together while cutting the tape roll. In one embodiment, a retractable bag cutter 388 may be provided to separate the used bag segment 380 from a next unused bag length 250. The lid 220 does not need to be opened during this operation.

Thus, the embodiments provide a human waste collection system with a basin 140 and a movable lid 220, where a continuous bag is rolled into a ring in a bag cassette 230 and mounted under the lid 220 of the seat 200. A bag feed system 280 is linked to the opening of the lid 220 and so that opening the lid 220 provides an unused bag segment 250, i.e., an unused portion of the continuous bag, in an upper portion 170 of the basin 140. In one embodiment, the system 280 is configured with a bag closing system 390 so that pivoting the interface actuator 255 twists the used bag segment 380 into a closed or sealed configuration. This is akin to a flushing operation. Optionally the closing system 390 is configured so that closing the lid twists the bag closed.

The embodiments provide the air mover 265 to guide waste into the unused bag segment 250, and the air mover 265 turns off after the lid 220 is closed. When an unused bag segment 250 is pulled into the upper portion 170 of the basin 140, a used bag segment 380 is simultaneously pushed into a lower portion 180 of the basin 140. The separator membrane 195 keeps the used bag segment 380 in the lower portion 180 of the basin 140.

According to the embodiments, a bag size may be flexible, depending on an amount of waste deposited in the bag. The utilization of a compression ring result in gravity not being required to load a new bag. In one embodiment, the used bag segment 380 is taped or sealed at the twist closure section. In one embodiment, the bags may be cut to separate portions of the continuous bag from used portions at the twist-closure 385 location. In one embodiment, the lower portion 180 of the basin 140 is configured to dehydrate and compact the waste within the used bag segment 380. In one embodiment, the gearing is electrically actuated. In one embodiment, the bags are scented. In one embodiment, spiral tracks are utilized instead of straight tracks for drawing an unused bag segment 250 from the bag cassette 230 and simultaneously twisting and compressing of the used bag segment 380.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A human waste collection system, for zero-gravity conditions, the collection system comprising:
   a basin having a lower end that defines a lower plane and configured for being positioned against a floor and an upper end that is spaced apart from the lower end and displaced further from the plane than the lower end;
   a seat positioned at the upper end of the basin, the seat having a lid pivotally connected to the seat;
   a bag cassette disposed under the seat; and
   a compression ring that is movable within the basin to automatically pull an unused bag segment from the bag cassette, and push down used bags;
   the basin includes an upper portion that includes the upper end, a lower portion that includes the lower end, and a neck between the upper and lower portions of the basin;

the compression ring is movable within the upper portion, between the upper end and the neck to urge the unused bag segment from the bag cassette;

the upper and lower portions of the basin are frustoconical and narrow toward the neck; and the compression ring compresses around the unused bag segment as the compression ring moves from the upper end to the neck, to thereby move the used bag downwardly.

2. The collection system of claim 1, wherein:

when a used bag segment is within the upper portion of the basin, while the compression ring moves toward the neck, the compression ring urges the used bag segment into the lower portion of the basin.

3. The collection system of claim 2, further including:

A flexible separator membrane at the neck of the basin, the separator membrane defining a center aperture through which the used bag segment moves when urged into the lower portion, wherein the separator membrane forms a flexible seal around bag material extending through the neck, to thereby capture the used bag segment within the lower portion of the basin.

4. The collection system of claim 2, wherein:

the compression ring automatically moves from the upper end to the neck when the lid opens, and from the neck to the upper end when the lid closes against the seat.

5. The collection system of claim 4, wherein:

the compression ring includes first and second ring halves that are separate from each other; and the first and second ring halves move towards each other as the compression ring moves from the upper end of the basin to the neck, to compress around the used bag segment.

6. The collection system of claim 5, wherein:

the upper portion of the basin includes first and second tracks that are spaced apart from each other and extend between the upper end of the basin and the neck;

the collection system further includes:

a first track connector connected to the first ring half and first track;

a second track connector connected to the second ring half and the second track, wherein the first and second track connectors are coupled to move together within the basin;

wherein, opening the lid moves the first and second connectors downwardly to move the compression ring downwardly; and closing the lid moves the first and second connectors upwardly to move the compression ring upwardly.

7. The collection system of claim 6, further including a first actuator that couples the lid and the first slider.

8. The collection system of claim 1, further including:

an interface actuator operationally coupled to the basin, wherein when the lid is opened and the interface actuator is engaged, the bag cassette spins to form a twist-closure in a used bag segment disposed in the basin.

9. The collection system of claim 8, wherein:

the collection system includes a second actuator coupled between the interface actuator and the bag cassette, the second actuator spins the bag cassette while the interface actuator is engaged.

10. The collection system of claim 9, wherein:

the bag cassette includes an external frame formed with gear teeth; and the second actuator engages with the gear teeth in the external frame of the bag cassette to spin the bag cassette while the interface actuator is engaged.

11. The collection system of claim 1, further including:

an air mover that directs air into the upper end, wherein the air mover activates when the lid opens to guide waste into the unused bag segment, and the air mover deactivates when the lid closes against the seat.

12. A lavatory for a spacecraft including: the collection system of claim 1.

* * * * *